Jan. 24, 1950 R. E. SAUNDERS ET AL 2,495,605
AIRCRAFT CONTROL HINGE CONSTRUCTION
Filed April 10, 1947 2 Sheets-Sheet 1
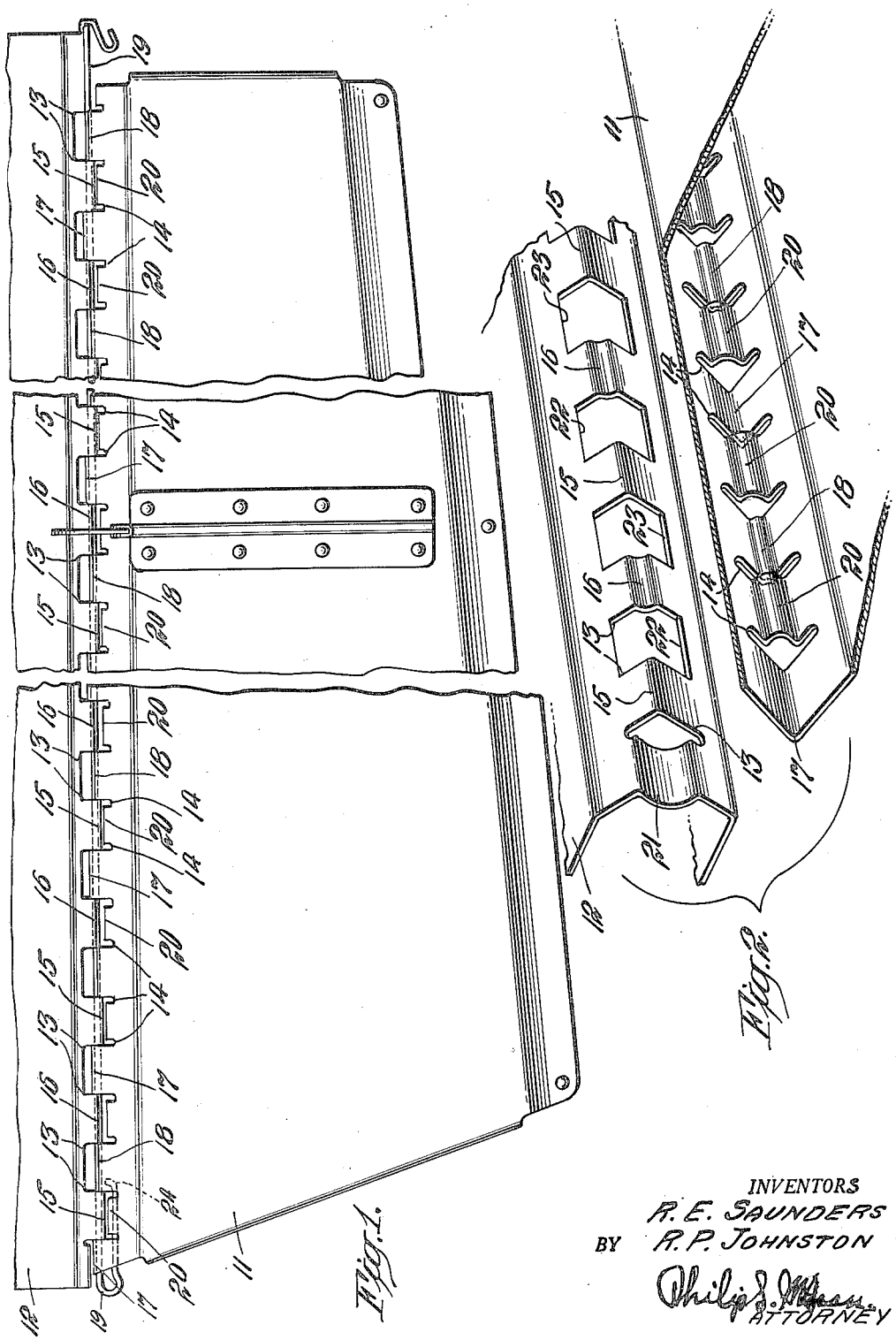
INVENTORS
R. E. SAUNDERS
R. P. JOHNSTON
BY
ATTORNEY

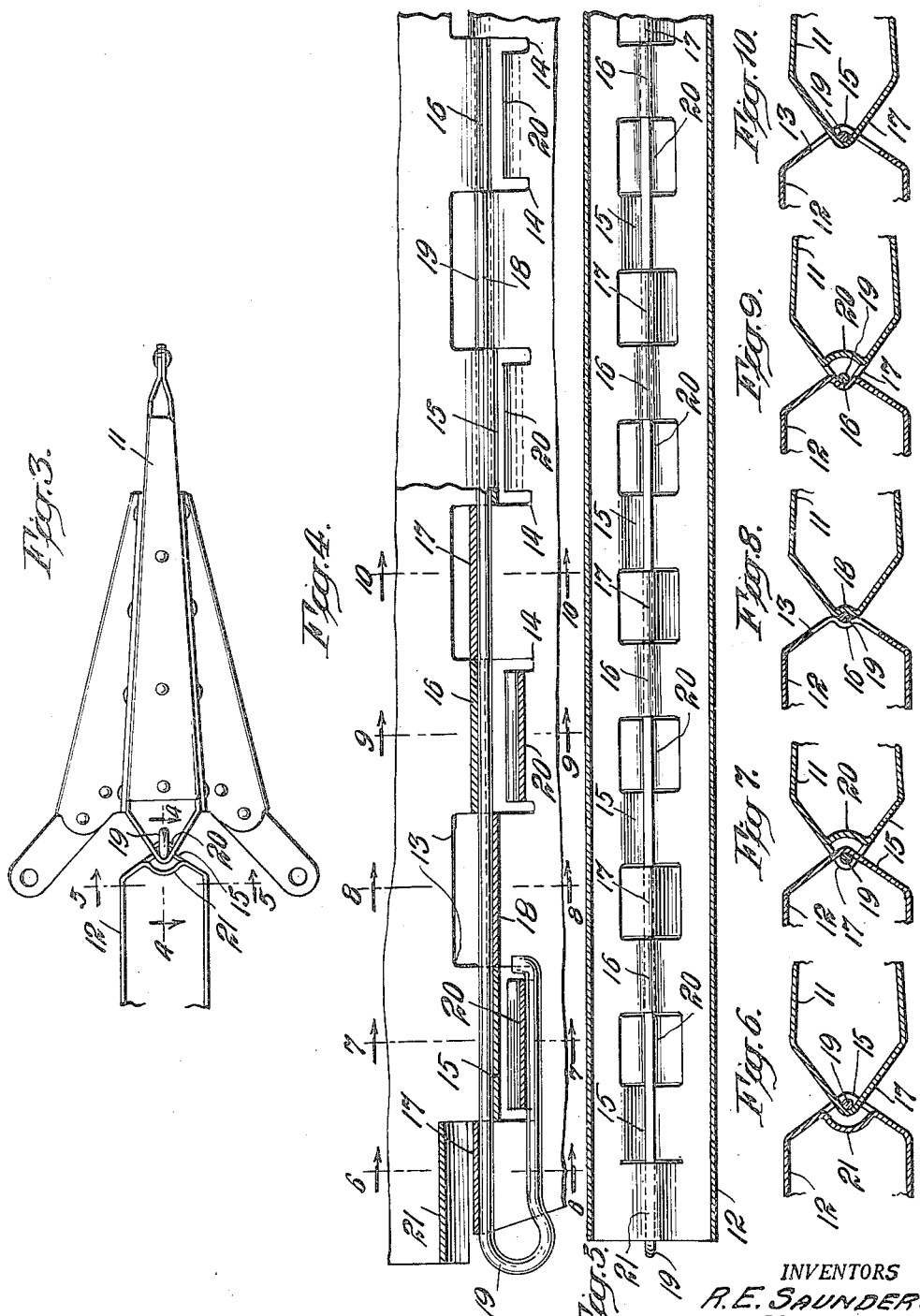

UNITED STATES PATENT OFFICE 2,495,605

AIRCRAFT CONTROL HINGE CONSTRUCTION

Richard E. Saunders and Ralph P. Johnston, Wichita, Kans., assignors to Beech Aircraft Corporation, Wichita, Kans., a corporation of Delaware Application April 10, 1947, Serial No. 740,558

5 Claims. (Cl. 16—128)

The invention here disclosed relates to the hinge construction for various forms of aircraft controls such, for example, as trim tabs and the like.

Objects of the invention are to provide a hinge structure for aircraft control surfaces which will be of light weight, low cost and high structural strength.

Other special objects of the invention are to provide a hinge of the character indicated which can be made up out of the parent material of the members which are joined together, with elimination of brackets, mountings and fastenings usually necessary with hinge constructions.

Other special objects of the invention are to provide a hinge construction for airfoil surfaces which while allowing free hinging action will hold the parts firmly connected without looseness or lost motion between the connected parts.

Further important objects of the invention are to provide a hinge construction for aircraft parts which can be quickly assembled or disassembled for the mounting and unmounting of the parts and which will be safe, reliable and generally desirable.

Other objects attained by the invention are set forth or will appear in the course of the following specification.

The drawings accompanying and forming part of the specification illustrate a present practical commercial embodiment of the invention. Structure, however, may be modified and changed as regards this illustrated embodiment, all within the true intent and broad scope of the invention as hereinafter defined and claimed.

Fig. 1 in the drawings is a broken plan view of a form of the invention as used for the mounting of a trim tab;

Fig. 2 is an enlarged broken and part sectional perspective view showing the companion hinge elements incorporated in the opposed edges of the mounting structure and tab;

Fig. 3 is a broken end view of the tab and mounting structure, as seen from the left in Fig. 1;

Fig. 4 is an enlarged broken longitudinal sectional view of the hinge parts as on substantially the plane of line 4—4 of Fig. 3;

Fig. 5 is a broken longitudinal sectional view as on substantially the plane of line 5—5 of Fig. 3;

Figs. 6 to 10, inclusive, are transverse sectional details on substantially the planes of the correspondingly numbered lines in Fig. 4.

In Figs. 1 and 3, a trim tab is indicated at 11, hingedly connected with a combined elevator and rudder airfoil 12.

A special feature of the present invention is that the material for the hinge forming elements is taken out of the folded edges of the parts to be connected, to provide companion hinge loops and bearing loops for a pintle wire extending through the hinge loops and engaged at the opposite sides by the bearing loops.

In the illustration, the material forming the skin for the control surface 12 is shown as notched transversely across the folded edge portion of this member at equi-distant points, as indicated at 13, and the opposing convergently folded edge of the tab material is shown as correspondingly slotted at 14.

This equi-distant cross slotting segregates the material at the folded edges into opposed projecting loops or straps. Certain of these straps are left in their projecting state to form the hinge knuckles and others of them are depressed to form bearings engageable with the pintle wire at the opposite side from the knuckle forming loops.

Fig. 2 particularly illustrates these features. In this view the fully projecting hinge connecting loops or straps on the control surface 12 are designated 15 and at the mid-point between these hinge loops are loops having the tip portions depressed in the form of bearing segments 16.

Similarly, the tab 11 has fully projecting hinge straps 17 and at mid-points between those, the inwardly depressed bearing straps 18, arranged to alternate with corresponding loops of the mounting member.

Thus, as shown in Fig. 2, the first hinge loop 17 of the tab will line up to the left of the first hinge loop 15 on the control surface 12, the first bearing loop 18 of the tab will stand to the left of the first bearing loop 16 of the control surface, and the second hinge loop 17 of the tab will stand to the left of the second hinge loop 15 on the control surface.

Consequently, when a hinge wire or pintle 19 is inserted through the overlapping hinge loops 15 and 17 of the two members, as in Fig. 1, bearing loops 16 and 18 of the two members will be engaged with the opposite sides of the hinge pin from the hinge loops and in alternating arrangement at points between the hinge loops.

This construction holds the members snugly connected, yet free to swing one on the other.

Clearance for the projecting hinge loops which surround the hinge wire may be provided in the opposing member by indenting the strap forming members at those points or by entirely cutting away such strap portions.

In the present illustrated embodiment the strap portions on the tab which come opposite the mounting hinge loops 15, are shown as deeply indented at 20 to clear or approximately clear the hinge loops of the mounting member. The latter is shown as having the strap portion at the left end of the same, which is opposite the first hinge loop 17 of the tab, deeply indented at 21 to avoid that hinge loop, and the other portions which come opposite the bearing loops 18 and hinge loops 17 as removed at 22, 23, to provide clearance for such loops.

The entry of the hinge loops 17 of the tab 11 into the openings 23 of the mounting structure positively locates and holds the parts against any longitudinal shifting.

By forming the loops out of the folded edges of the skin, any need for mounting brackets or the like is avoided. The strength of the material of which the member is formed is utilized for hinging purposes. In thus using the parent material external projections are avoided and the weight is kept down to a minimum. The parts are readily connected and disconnected.

The hinge wire may be locked in place by bending a retaining hook 24 at the outer end of the same to interlock over an adjoining strap element, in this case the more fully indented first clearance loop 20 of the tab.

The construction is simple and practical. The elements required for the hinge connection are taken from the coverings of the jointed members without weakening those members and without impairing their airfoil design. The cooperative action of the pintle encircling hinge loops and the abutment loops bearing on the opposite sides of the pintle prevent looseness or vibration. The confining and bearing loops constitute, in effect, half bearings or bearing segments engaging opposite sides of the pintle to provide substantially the effect of full or complete bearings maintaining the parts at all times in proper alignment and accurately hinged relation. The hinge loops are of full length to reach about the far side of the pintle. The bearing loops, on the other hand, are foreshortened to engage only about the near side of the pintle.

What is claimed is:

1. In a hinge construction, members of sheet material having folded edges cut through transversely into separate loops, certain of said loops being left fully extended to form pintle embracing hinge connecting loops and other loops between said hinge connecting loops being indented at the tips of the same to form outwardly open bearing segment loops, the hinge and bearing loops of one member being aligned in alternating relation with the bearing and hinge loops of the other member and a pintle extending through the hinge loops and engaged by the bearing loops of the two members.

2. A hinge construction comprising companion folded hinge leaves each having pintle embracing hinge loops spaced apart along the hinge axis and other loops between the hinge loops indented in the form of pintle abutting open bearings, said leaves being aligned and arranged with a hinge loop and bearing loop of one leaf between adjacent hinge loops of the other leaf and a pintle extending through the aligned hinge loops and engaged at the sides of said hinge loops by said open bearings of the bearing loops.

3. A hinge construction comprising companion folded hinge leaves each having pintle embracing hinge loops spaced apart along the hinge axis and other loops between the hinge loops indented in the form of pintle abutting open bearings, said leaves being aligned and arranged with a hinge loop and bearing loop of one leaf between adjacent hinge loops of the other leaf and a pintle extending through the aligned hinge loops and engaged at the sides of said hinge loops by said open bearings of the bearing loops, the bearing loops of each leaf being disposed immediately adjoining a hinge loop of the other leaf and engaging the same side of the pintle as engaged by said hinge loop of the other leaf.

4. A hinge construction comprising companion folded hinge leaves each having a pair of pintle embracing hinge loops spaced apart along the hinge axis and a bearing loop between the same indented into a pintle abutting open bearing, said leaves being arranged with the hinge loops aligned to embrace the hinge axis and with the bearing loop of each leaf at one side of a hinge loop of the other leaf and a pintle extending through and engaged at opposite sides by the hinge loops of the two leaves and engaged between the encircling hinge loops by the open bearings of the immediately adjoining bearing loops.

5. The hinge construction herein disclosed and comprising companion hinge leaves having folded edges divided transversely into separate loops, certain of said loops projecting to form pintle embracing hinge loops spaced apart along the hinge axis and other of said loops indented in the form of pintle abutting, open bearing segments, said leaves being aligned and arranged with the hinge loops and open bearing segment loops of the leaves in staggered relation and a pintle extending through the aligned hinge loops and engaged at opposite sides by the open bearing segment loops.

RICHARD E. SAUNDERS.
RALPH P. JOHNSTON.

REFERENCES CITED

The following references are of record in the file of this patent:

UNITED STATES PATENTS

| Number | Name | Date |
|---|---|---|
| 583,629 | Oldenbusch | June 1, 1897 |